United States Patent
Kim et al.

(10) Patent No.: US 10,374,985 B2
(45) Date of Patent: Aug. 6, 2019

(54) METHODS, DEVICES AND COMPUTER-READABLE MEDIUMS PROVIDING CHAT SERVICE

(71) Applicant: LINE Corporation, Tokyo (JP)

(72) Inventors: Kyoung Yun Kim, Seongnam-si (KR); Young Min Moon, Seongnam-si (KR); Do Young Park, Seongnam-si (KR); Jae Wook Kwon, Seongnam-si (KR)

(73) Assignee: LINE Corporation, Tokyo (JP)

( * ) Notice: Subject to any disclaimer, the term of this patent is extended or adjusted under 35 U.S.C. 154(b) by 119 days.

(21) Appl. No.: 14/825,463

(22) Filed: Aug. 13, 2015

(65) Prior Publication Data

US 2016/0191578 A1    Jun. 30, 2016

(30) Foreign Application Priority Data

Dec. 31, 2014    (KR) .................. 10-2014-0195313

(51) Int. Cl.
*G06F 15/16* (2006.01)
*H04L 12/58* (2006.01)
*H04L 12/18* (2006.01)

(52) U.S. Cl.
CPC .......... *H04L 51/04* (2013.01); *H04L 12/1822* (2013.01)

(58) Field of Classification Search
CPC ... H04L 65/403; H04L 51/04; H04L 12/1822; H04M 1/72552; G06F 3/0486; G06F 3/04883
See application file for complete search history.

(56) References Cited

U.S. PATENT DOCUMENTS

| | | | |
|---|---|---|---|
| 8,843,835 B1 * | 9/2014 | Busey | H04L 12/1813 715/739 |
| 9,489,657 B2 * | 11/2016 | Chudge | H04L 12/1813 |
| 2004/0078444 A1 * | 4/2004 | Malik | G06Q 10/107 709/206 |
| 2004/0260770 A1 * | 12/2004 | Medlin | G06Q 10/107 709/204 |

(Continued)

FOREIGN PATENT DOCUMENTS

| | | |
|---|---|---|
| KR | 2001-0073352 A | 8/2001 |
| KR | 2009-0129726 A | 12/2009 |
| KR | 2013-0029525 A | 3/2013 |

OTHER PUBLICATIONS

Korean Office Action dated Jan. 13, 2016, issued in Korean Patent Application No. 10-2014-0195313.

(Continued)

*Primary Examiner* — Cheikh T Ndiaye
(74) *Attorney, Agent, or Firm* — Harness, Dickey & Pierce, P.L.C.

(57) ABSTRACT

A method of providing a chat service between a first device and a plurality of second devices, includes: creating a first chat room configured to display visual signs transmitted and received between the first device and the plurality of second devices; receiving a command to select one or more of the plurality of second devices while the first chat room is displayed on the first device; selecting the one or more of the plurality of second devices based on the command; and creating a second chat room configured to display visual signs transmitted and received between the first device and the selected one or more of the plurality of second devices.

15 Claims, 19 Drawing Sheets

(56) References Cited

U.S. PATENT DOCUMENTS

| | | | | |
|---|---|---|---|---|
| 2006/0212583 | A1* | 9/2006 | Beadle | G06F 15/16 |
| 2007/0288560 | A1* | 12/2007 | Bou-Ghannam | G06Q 10/107 |
| | | | | 709/204 |
| 2009/0228944 | A1* | 9/2009 | Bodlaender | H04L 12/1827 |
| | | | | 725/110 |
| 2009/0307319 | A1* | 12/2009 | Dholakia | H04L 12/1822 |
| | | | | 709/206 |
| 2013/0069969 | A1* | 3/2013 | Chang | H04L 12/581 |
| | | | | 345/589 |

OTHER PUBLICATIONS

Korean Office Action dated Aug. 20, 2015, issued in Korean Patent Application No. 10-2014-0195313.

* cited by examiner

FIG. 5A-A
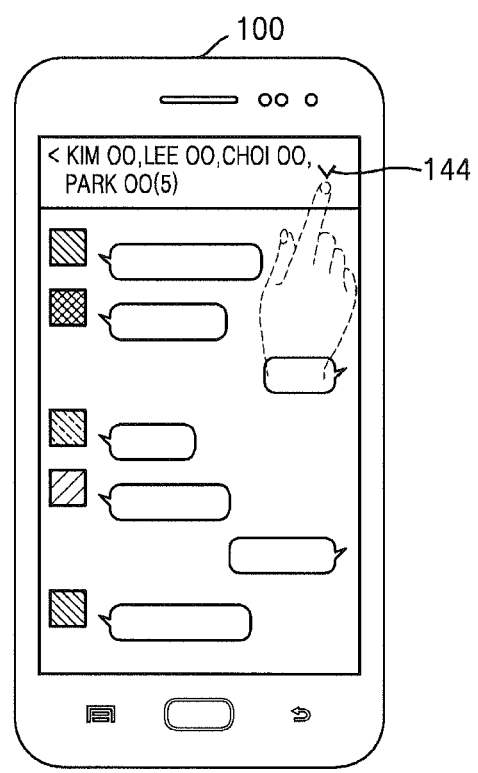

FIG. 5A-B
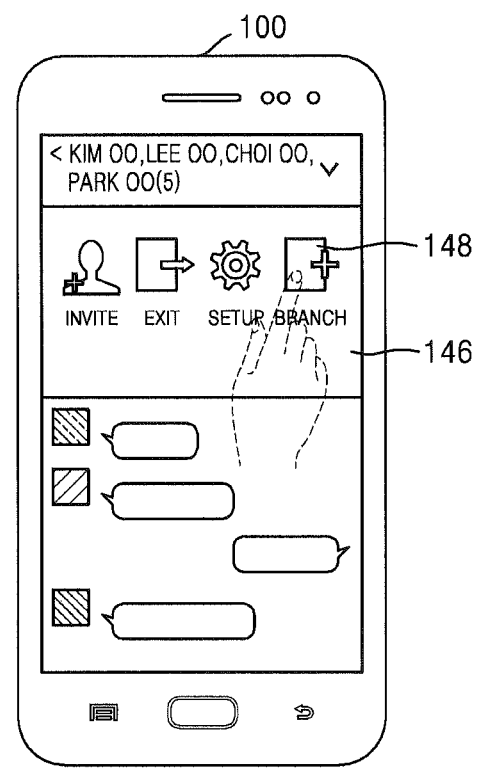

FIG. 5A-C
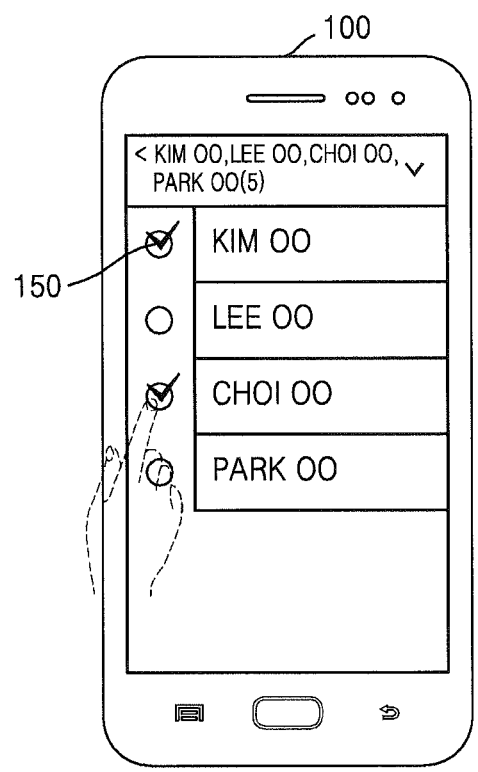

FIG. 5B-A
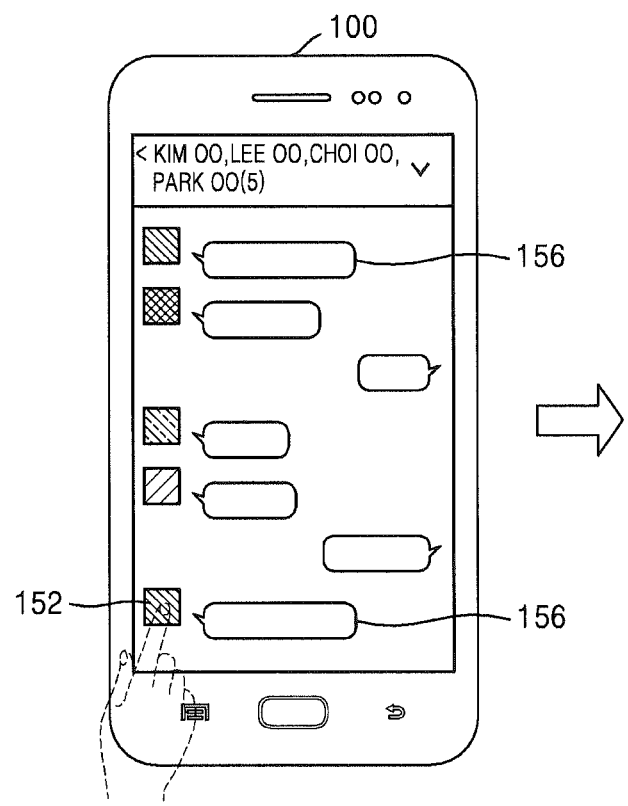

FIG. 5B-B
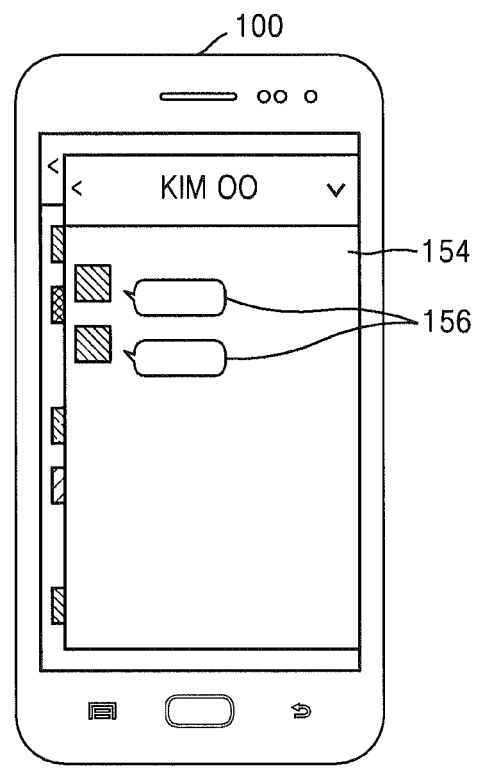

FIG. 5C-A
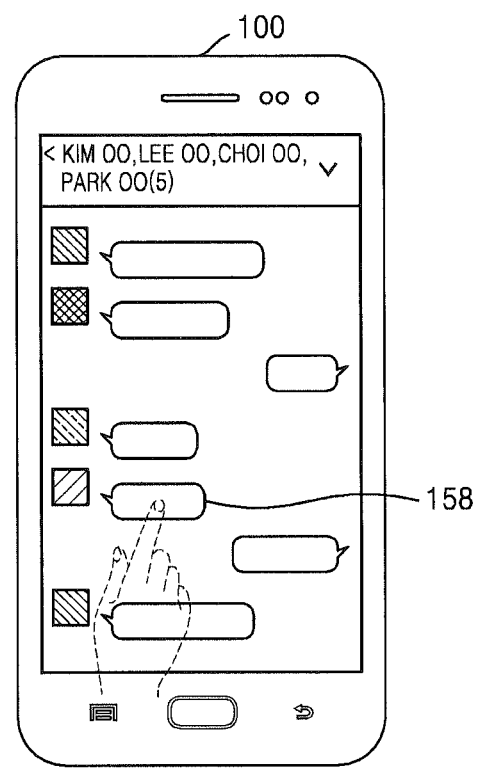

FIG. 5C-B
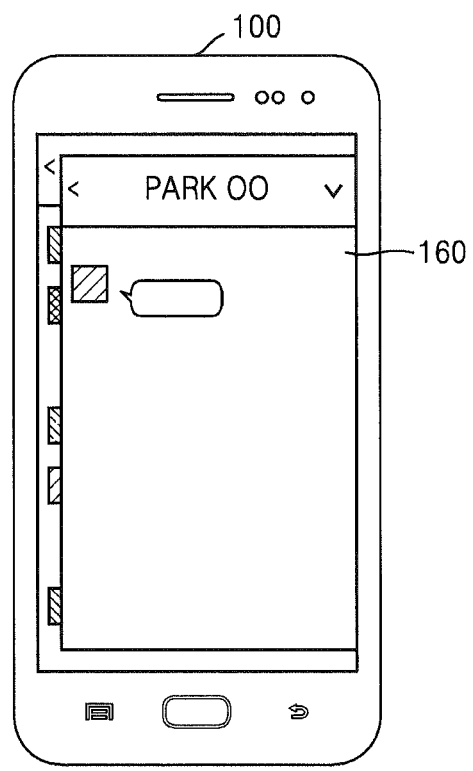

METHODS, DEVICES AND COMPUTER-READABLE MEDIUMS PROVIDING CHAT SERVICE

CROSS-REFERENCE TO RELATED APPLICATION(S)

This application claims priority under 35 U.S.C. § 119 to Korean Patent Application No. 10-2014-0195313, filed on Dec. 31, 2014, in the Korean Intellectual Property Office, the entire contents of which is incorporated herein by reference.

BACKGROUND

Field

One or more example embodiments relate to methods, devices and/or computer-readable mediums providing chat services.

Description of the Related Art

As electronic communication technology has advanced, users have become able to perform various functions using devices capable of performing electronic communication. The term "device" refers to a personal computer (PC) or a portable terminal. Such devices are widely available and many users are quite familiar with installing various programs thereon, deleting programs therefrom, and directly accessing communication networks via a wireless Internet.

Such devices are capable of transmitting and receiving data there between via communication networks. Accordingly, chat services through multilateral visual signs have been actively developed and used. Chat services such as these enable transmission and reception of visual signs between devices, and display of the visual signs on the devices.

SUMMARY

One or more example embodiments provide methods, devices and/or computer-readable storage mediums for providing chat services, which are capable of allowing all or part of members to progress visual-sign conversations through a second chat room in the process of visual-sign multilateral conversations through a first chat room, thus progressing conversation about a separate topic or conversation associated with only some specific members.

One or more example embodiments also provide methods, devices and/or computer-readable storage mediums for providing a chat service, which are capable of merging content of conversations in a first chat room with content of conversations in a second chat room, and displaying the merged content of conversations in a single chat room, thus confirming the content of conversations having progressed in a plurality of chat rooms at once.

At least one example embodiment provides a method of providing a chat service between a first device and a plurality of second devices, the method comprising: creating a first chat room to display first visual signs transmitted between the first device and the plurality of second devices; receiving a command to select one or more of the plurality of second devices while the first chat room is displayed on the first device; selecting the one or more of the plurality of second devices based on the command; and creating a second chat room to display second visual signs transmitted between the first device and the selected one or more of the plurality of second devices.

At least one other example embodiment provides a non-transitory computer-readable recording medium having recorded thereon a program that, when executed by a computer, causes the computer to perform a method of providing a chat service between a first device and a plurality of second devices, the method comprising: creating a first chat room to display first visual signs transmitted between the first device and the plurality of second devices; receiving a command to select one or more of the plurality of second devices while the first chat room is displayed on the first device; selecting the one or more of the plurality of second devices based on the command; and creating a second chat room to display second visual signs transmitted between the first device and the selected one or more of the plurality of second devices.

According to at least some example embodiments, the command may be a command to select one or more of the first visual signs displayed in the first chat room; and the selecting may select, as the one or more of the plurality of second devices, one or more of the plurality of second devices having transmitted the selected one or more of the first visual signs.

The method may further include displaying the selected one or more of the first visual signs in the second chat room.

The method may further include displaying, in the second chat room, the first visual signs transmitted by the selected one or more of the plurality of second devices.

The method may further include displaying, on a single screen after the creating of the second chat room, first visual signs created in the first chat room and second visual signs created in the second chat room.

The method may further include discriminatively displaying, on a single screen after the creating of the second chat room, first visual signs created in the first chat room and second visual signs created in the second chat room.

The method may further include: merging, after the creating of the second chat room, the first visual signs displayed in the first chat room with the second visual signs displayed in the second chat room; and displaying the merged visual signs in the first chat room.

The method may further include: merging, after the creating of the second chat room, the first visual signs displayed in the first chat room with the second visual signs displayed in the second chat room; and discriminatively displaying, in the first chat room, first visual signs created in the first chat room and second visual signs merged from the second chat room.

The method may further include: merging the second visual signs displayed in the second chat room with the first visual signs displayed in the first chat room; and displaying the merged visual signs in the first chat room; wherein the merging and the displaying are based on permission received from at least one of the first device and the selected one or more of the plurality of second devices.

The method may further include: merging visual signs permitted by at least one of the first device and the selected one or more of the plurality of second devices with the first visual signs displayed in the first chat room; and displaying the merged visual signs in the first chat room.

The method may further include transmitting, based on permission received from at least one of the first device and the selected one or more of the plurality of second devices, the second visual signs displayed in the second chat room to one or more of the plurality of second devices not participating in the second chat room.

The method may further include storing, in an electronic file, at least one of the first visual signs displayed in the first chat room or the second visual signs displayed in the second chat room.

The method may further include closing the second chat room when the first chat room is closed.

At least one other example embodiment provides a method of providing a chat service between a first device and a plurality of second devices, the method comprising: creating a first chat room configured to display first visual signs transmitted between the first device and a first set of the plurality of second devices; creating a second chat room configured to display second visual signs transmitted between the first device and a second set of the plurality of second devices; creating a third chat room, merging the first visual signs displayed in the first chat room with the second visual signs displayed in the second chat room; and displaying the merged visual signs in the third chat room.

At least one other example embodiment provides non-transitory computer-readable recording medium having recorded thereon a program that, when executed by a computer, causes the computer to perform a method of providing a chat service between a first device and a plurality of second devices, the method comprising: creating a first chat room configured to display first visual signs transmitted between the first device and a first set of the plurality of second devices; creating a second chat room configured to display second visual signs transmitted between the first device and a second set of the plurality of second devices; creating a third chat room, merging the first visual signs displayed in the first chat room with the second visual signs displayed in the second chat room; and displaying the merged visual signs in the third chat room.

According to at least some example embodiments, the method may further include discriminatively displaying, in the third chat room, first visual signs created in the first chat room and second visual signs created in the second chat room.

The method may further include merging the first visual signs displayed in the first chat room with the second visual signs displayed in the second chat room; wherein the merging and the displaying are based on permission received from at least one of the first device, the first set of the plurality of second devices, and the second set of the plurality of second devices.

The method may further include merging only visual signs permitted by at least one of the first device, the first set of the plurality of second devices, and the second set of the plurality of second devices.

According to at least some example embodiments, the displaying may include displaying, in the third chat room, visual signs transmitted between the first device, the first set of the plurality of second devices, and the second set of the plurality of second devices.

Other aspects, features, and/or advantages of inventive concepts will be apparent from the following detailed description and claims, taken in conduction with the accompanying drawings.

Such general and specific aspects of inventive concepts may be performed using systems, methods, computer-readable storage mediums, and/or combinations thereof.

BRIEF DESCRIPTION OF THE DRAWINGS

Inventive concepts will become apparent and more readily appreciated from the following description of some example embodiments, taken in conjunction with the accompanying drawings in which:

FIGS. 5A-A, 5A-B, 5A-C, 5B-A, 5B-B, 5C-A and 5C-B are diagrams for describing a method of creating a second chat room, according to an example embodiment;

DETAILED DESCRIPTION

Figure 1:
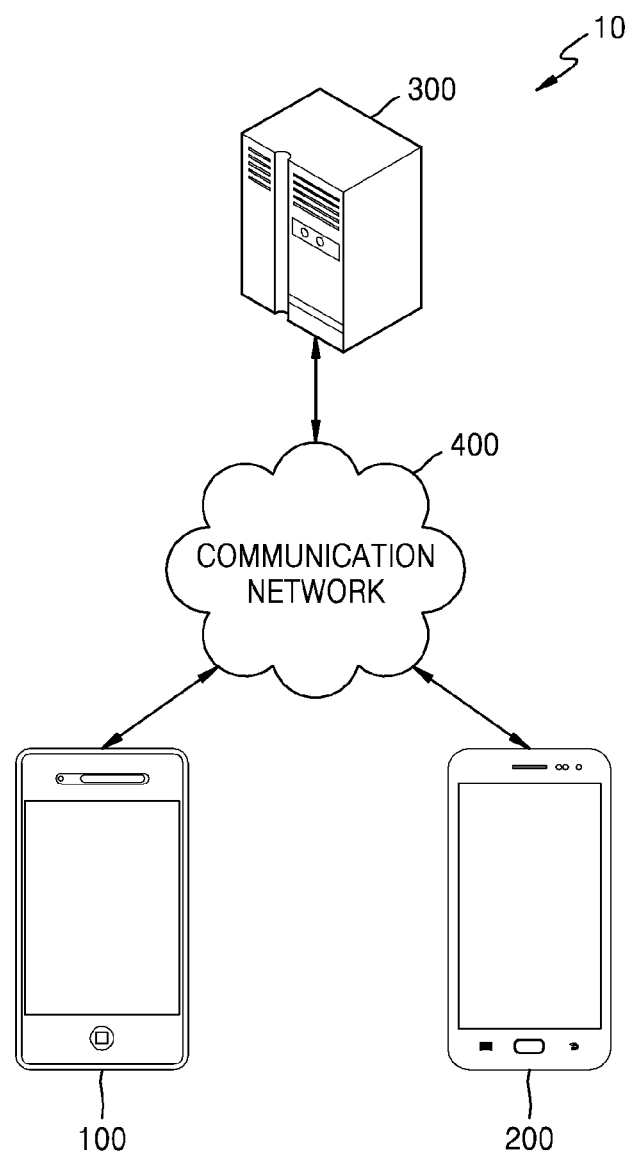
FIG. 1 is a diagram illustrating a configuration of a system for providing a chat service, according to an example embodiment.

Reference will now be made in detail to embodiments, examples of which are illustrated in the accompanying drawings, wherein like reference numerals refer to like elements throughout. In this regard, example embodiments may have different forms and should not be construed as being limited to the descriptions set forth herein. Accordingly, the example embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Example embodiments will be described in detail with reference to the accompanying drawings. Inventive concepts, however, may be embodied in various different forms, and should not be construed as being limited only to the illustrated example embodiments. Rather, these embodiments are provided as examples so that this disclosure will be thorough and complete, and will fully convey inventive concepts to those skilled in the art. Accordingly, known processes, elements, and techniques are not described with respect to some of the example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In the description below, it will be understood that when an element such as a layer, region, substrate, plate, or member is referred to as being "on" another element, it can be directly on the other element or intervening elements may be present. In contrast, the term "directly" means that there are no intervening elements.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors. The hardware devices may be configured as special purpose processing circuits and/or hardware devices to perform functions illustrated in one or more of the flow charts or sequence diagrams discussed herein.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Hereinafter, some example embodiments will be described in detail with reference to the accompanying drawings. In this regard, the same or corresponding elements will be denoted by the same reference numerals and will not be redundantly described herein.

FIG. 1 is a diagram illustrating a configuration of a system 10 for providing a chat service, according to an example embodiment.

Referring to FIG. 1, the system 10 for providing a chat service, according to at least this example embodiment, may include a first device 100 and a second device 200. In addition, the system 10 for providing a chat service may further include a communication network 400 configured to connect the first device 100 and the second device 200 to each other. In addition, the system 10 for providing a chat service may further include a server 300 configured to be connected to the first device 100 or the second device 200 via the communication network 400.

The first device 100 may be a device for providing a chat service in the system 10 for providing a chat service according to at least this example embodiment. The second device 200 also may be a device for providing a chat service in the system 10 for providing a chat service according to at least this example embodiment. The first device 100 may refer to a communication terminal that is capable of transmitting and receiving data with other devices in a wired and/or wireless communication environment. The second device 200 also may refer to a communication terminal that is capable of transmitting and receiving data with other devices in a wired and/or wireless communication environment. In FIG. 1, the first device 100 and the second device 200 are illustrated as smart phones, but inventive concepts should not be limited thereto. Any devices may be used as the first device 100 and the second device 200 as long as the devices are capable of transmitting and receiving data with other devices in the wired and/or wireless communication environment as described above.

More specifically, the first device 100 and the second device 200 may be, for example, smart phones, PCs, tablet PCs, smart TVs, mobile phones, personal digital assistants (PDAs), laptop computers, media players, micro servers, global positioning system (GPS) devices, e-book terminals, digital broadcasting terminals, navigations, kiosk, MP3 players, digital cameras, wearable devices, and other mobile or non-mobile computing devices, but inventive concepts are not limited to these examples.

In addition, the first device 100 and the second device 200 may include various devices, such as electronic bulletin boards or touch screens, which are capable of receiving touch input. Furthermore, the first device 100 and the second device 200 may be accessories, such as a watch, glasses, a hair band, a ring, etc., which have a communication function and a data processing function, but inventive concepts are not limited to these examples.

The first device 100 may perform a conversation with the second device 200 through visual signs. Although only one second device 200 is illustrated in FIG. 1, the first device 100 may converse with a plurality of second devices 200 through visual signs. That is, for example, the first device 100 may transmit and receive the visual signs with the second devices 200, and the first device 100 may display the visual signs indicating the conversation between users on a display unit thereof. In addition, the second devices 200 may display the visual signs indicating the conversation between users on display units thereof.

According to at least some example embodiments, the visual signs may be visually recognized just like alphabets, pictures, and photographs, and may refer to objects, which are capable of transmitting information to a called party in a visual form, or a set of the objects. For example, the visual signs may include text messages, pictures, photographs, sentences generated by combinations thereof, or emoticons, which are displayable on the display unit of the first device 100, but inventive concepts are not limited to these examples.

The server 300 may be a server configured to provide a chat service. Although only one server 300 is illustrated in FIG. 1, a plurality of servers may be present according to traffic and/or data quantity.

Besides the chat service, the server 300 may provide a general search service and various services for improving other user experiences. That is, for example, besides the chat service, the server 300 may provide various services, such as a search service, an email service, a blogging service, a social network service, a news service, a shopping information providing service, etc. However, example embodiments should not be limited to these examples.

Alternatively, the server 300 may be a server that is connected to a server that provides a portal service, such as a search service, an email service, a news service, and a shopping service, and provides a webpage, which is provided by the portal service, to the first device 100 that requests the portal service to provide information. The server 300 and the portal service providing server may be separate servers that are physically separate from each other, or may be the same server that is divided conceptually.

The server 300 may store the content of the conversations between the first device 100 and the second device 200. In FIG. 1, the first device 100 is illustrated as directly transmitting and receiving data to and from the second device 200 via the communication network 400, but the data transmission and reception between the first device 100 and the second device 200 may be performed through the server 300. That is, for example, the visual signs, which are transmitted from the first device 100 in the form of electronic signals, may be transmitted to the server 300 via the communication network 400, and then the server 300 may transmit the corresponding visual signs to the second device 200 via the communication network 400.

The communication network 400 may be configured to connect the first device 100 and the second device 200 to each other. In addition, the communication network 400 may be configured to connect the first device 100 and the second device 200 to the server 300. That is, for example, the communication network 400 may refer to a communication network configured to provide a connection path that allows data, including the visual signs, to be transmitted and received between the first device 100 and the second device 200. Examples of the communication network 400 may include a wired network, such as one or more local area networks (LANs), wide area networks (WANs), metropolitan area networks (MANs), or integrated service digital networks (ISDNs), and one or more wireless networks, such as wireless LANs, code division multiple access (CDMA) networks, Bluetooth, satellite communications networks, etc. However, inventive concepts should not be limited to these examples.

Figure 2:
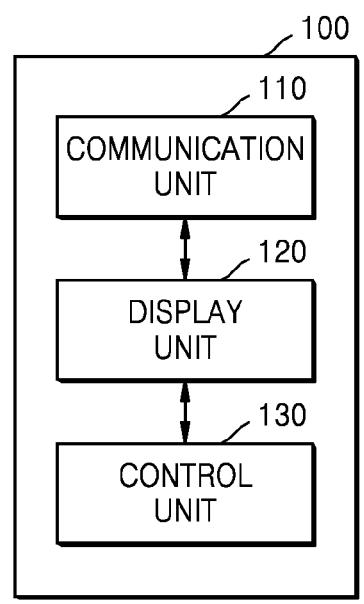
FIG. 2 is a block diagram illustrating an example internal configuration of a device for providing a chat service in the system for providing a chat service in FIG. 1.

FIG. 2 is a block diagram illustrating an example internal configuration of a device for providing a chat service in the system 10 for providing a chat service shown in FIG. 1.

Referring to FIG. 2, the first device 100, which is the device for providing a chat service in the system 10, may include a communication unit 110, a display unit 120, and a control unit 130.

The communication unit 110 may perform wired and/or wireless communication with at least one of the second devices 200 and the server 300. The communication unit 110 may be a Bluetooth communication unit, a Bluetooth low energy (BLE) communication unit, a near field communication (NFC) unit, a wireless local access network (WLAN) (Wi-Fi) communication unit, a ZigBee communication unit, an infrared data association (IrDA) communication unit, a Wi-Fi direction (WFD) communication unit, an ultra-wideband (UWB) communication unit, or an Ant+ communication unit, but inventive concepts should not be limited to these examples.

The communication unit 110 may transmit and receive a wireless signal with at least one of a base station, the second devices 200, and the server 300 on the communication network 400. The wireless signal may include various types of data, including the visual signs. That is, for example, the communication unit 110 may transmit the visual signs to the second device 200 and receive the visual signs from the second device 200.

The display unit 120 may display information processed by the first device 100. The display unit 120 may display the visual signs transmitted and received between the first device 100 and the second device 200. For example, the display unit 120 may display a chat room in which the content of conversations between a user of the first device 100 and users of the second devices 200 are made up, and may display the visual signs transmitted and received in the corresponding chat room.

The chat room is a type of a user interface (UI) displayed on the display unit 120, and the display unit 120 may display the visual signs transmitted and received between the first device 100 and the second device 200 within the corresponding UI in a given (or alternatively, desired or predetermined) format. The display unit 120 may concurrently and/or simultaneously display two or more chat rooms.

The display unit 120 may include at least one selected from a liquid crystal display (LCD), a thin-film transistor-liquid crystal display (TFT-LCD), an organic light-emitting diode (OLED), a flexible display, a three-dimensional (3D) display, and an electrophoretic display, but inventive concepts should not be limited to these examples. According to the implementation type of the first device 100, the first device 100 may include two or more display units 120.

The control unit 130 may control the overall operation of the first device 100. For example, the control unit 130 may control the overall operations of the communication unit 110 and the display unit 120 by executing programs stored in a memory of the first device 100. In order to perform the operation of the first device 100 as illustrated in FIGS. 1 to 8, the control unit 130 may control the overall operations of the communication unit 110 and the display unit 120.

More specifically, for example, the control unit 130 may create a first chat room capable of displaying the visual signs transmitted and received between the first device 100 and the second devices 200. The process of creating the first chat room may be a process of allocating a space for storing the visual signs transmitted and received between the first device 100 and the second devices 200 to a memory of the first device 100. The control unit 130 may or may not display the created first chat room on the display unit 120. The control unit 130 may sequentially display the visual signs in the first chat room according to the order of creation of the corresponding visual signs or the transmission and reception times of the corresponding visual signs. In this case, the control unit 130 may display the visual signs in the first chat room such that the corresponding visual signs are sequentially arranged in a first direction. For example, in a case where the first direction is a downward direction, the control unit 130 may display an earlier transmitted or received visual sign at a first position of the first chat room and display a later transmitted or received visual sign at a second position of a second chat room under the first position.

In addition, the control unit 130 may create the second chat room capable of displaying at least some of the visual signs transmitted and received through the first chat room.

Furthermore, the control unit 130 may detect a selection command of selecting some of the content of conversations of the first chat room, and the control unit 130 may create the second chat room while the content of conversations selected by the corresponding selection command are displayed in the second chat room. In this case, the control unit 130 may set only some second devices 200 having transmitted the content of conversations selected by the corresponding selection command as participants of the second chat room.

When generating the second chat room, the control unit 130 may set the second chat room as a chat room that is subordinate to the first chat room. That is, for example, when the first chat room is closed, the control unit 130 may also close the second chat room. In addition, when the second chat room is closed, the control unit may merge the visual signs displayed in the second chat room with the visual signs displayed in the first chat room and display the merged visual signs in the first chat room.

Furthermore, the control unit 130 may display only the first chat room on the display unit 120, may display only the second chat room, and/or may display the first chat room and the second chat room concurrently and/or simultaneously.

Figure 3:
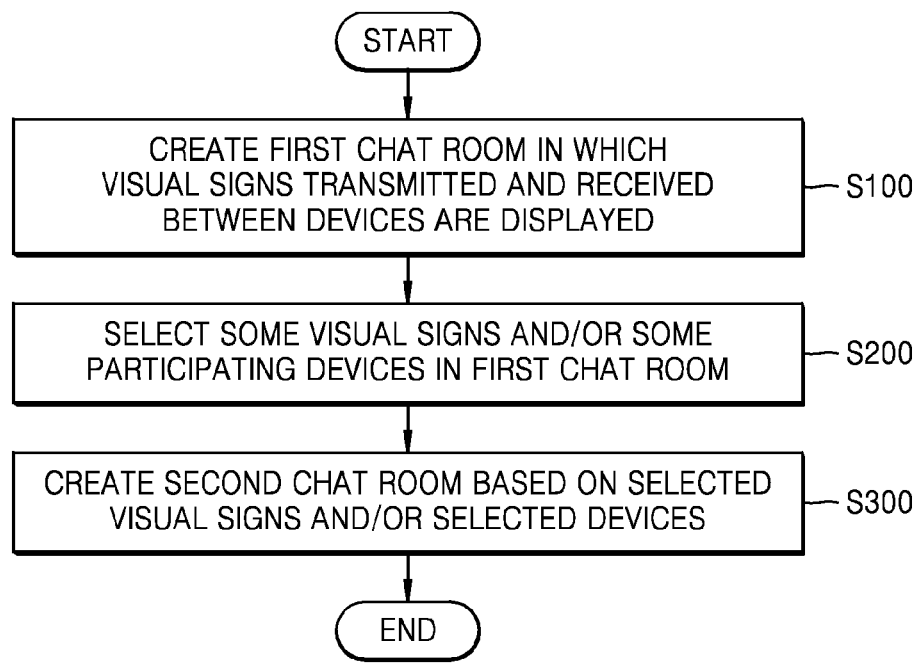
FIG. 3 is a flowchart of a method of providing a chat service, according to an example embodiment.

FIG. 3 is a flowchart of a method of providing a chat service, according to an example embodiment.

The flowchart illustrated in FIG. 3 may include operations processed in time series by the first device 100 that is the device for providing a chat service in FIG. 2. Therefore, even though omitted below, the descriptions provided with reference to the configuration of FIG. 2 may be applied to the flowchart of FIG. 3.

Referring to FIG. 3, the method of providing a chat service, according to at least this example embodiment, may include operation S100 of creating a first chat room in which a plurality of visual signs transmitted and received between a plurality of devices are displayable, operation S200 of selecting some visual signs and/or some participating devices in the first chat room, and operation S300 of creating a second chat room based on the selected visual signs and/or the selected devices. After operation S300, the method of providing a chat service may further include concurrently and/or simultaneously displaying visual signs created in the first chat room and visual signs created in the second chat room on a single screen. The operation of concurrently and/or simultaneously displaying the visual signs may include discriminatively displaying the visual signs created in the first chat room and the visual signs created in the second chat room. After operation S300, the method of providing a chat service may further include merging the visual signs created in the first chat room and the visual signs created in the second chat room, and displaying the merged visual signs in one chat room. According to at least some example embodiments, the visual signs created in the first chat room may be visual signs transmitted between a first device and a first set of a plurality of second devices, and the visual signs created in the second chat room may be visual signs transmitted between the first device and a second set of the plurality of second devices.

Figure 4A:
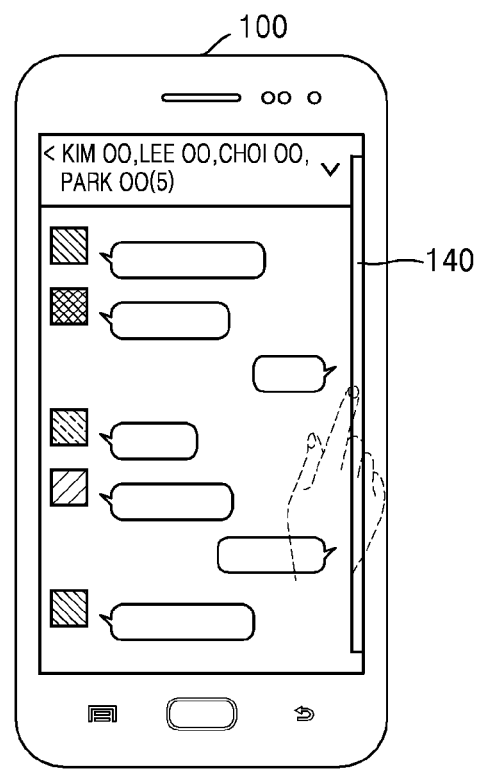
FIGS. 4A and 4B are diagrams for describing a method of displaying a second chat room during displaying of a first chat room, according to an example embodiment.
Figure 4B:
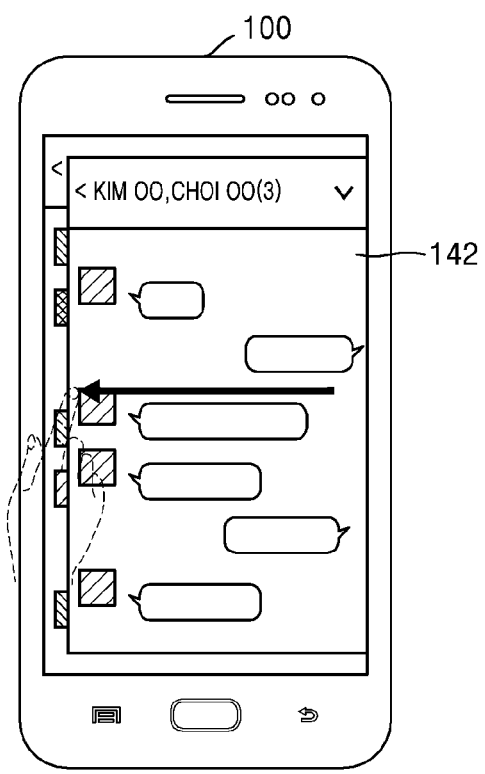

FIGS. 4A and 4B are diagrams for describing the method of displaying the second chat room during the displaying of the first chat room.

Referring to FIG. 4A, the method of providing a chat service, according to at least this example embodiment, may display visual signs indicating the content of multilateral conversations according to the input times or the transmission and reception times of the corresponding visual signs. In this case, the first chat room, in which the visual signs transmitted and received between the first device 100 and the second devices 200 are sequentially displayed, may be displayed on the display unit of the first device 100. In addition, visual signs, which are directly created through the first device 100, may be displayed while being aligned at a first side of the display unit of the first device 100. Visual signs, which are received from the second devices 200, may be classified according to the second devices 200 having transmitted the content of conversations and be displayed while being aligned at a second side opposite to the first side of the display unit. In this case, the second devices 200 may be classified through UIs that indicate different texts, pictures, photographs, etc.

At this time, when the first chat room is being displayed on the display unit of the first device 100, a portion of the second chat room or a UI for calling the second chat room may be displayed on the display unit of the first device 100. For example, as illustrated in FIG. 4A, the first chat room may be displayed on the display unit of the first device 100. In this case, a UI 140 indicating the second chat room may be displayed at one side of the display unit of the first device 100. At this time, the first device 100 may receive a user input of displaying the second chat room on the display unit of the first device 100. For example, as illustrated in FIG. 4B, the first device 100 may detect a user action of touching and dragging the UI 140 indicating the second chat room. In this case, the first device 100 may display the second chat room 142 on the display unit of the first device 100. In this manner, the user may more easily switch the display unit so as to progress conversation through the second chat room in the process of progressing conversation through the first chat room.

In FIGS. 4A and 4B, the second chat room is illustrated as being subordinate to the first chat room, but this is only an example. The second chat room may be parallel to, and independent of, the first chat room.

FIGS. 4A and 4B illustrate an example of a method of switching the situation of displaying the first chat room to the situation of displaying the second chat room, but the type of the chat room displayed on the first device 100 may be switched by using other various methods.

FIGS. 5A-A, 5A-B and 5A-C are diagrams for describing the method of creating the second chat room, according to an example embodiment.

FIG. 5A-A is a diagram for describing a method of creating the second chat room by selecting users to participate in the second chat room, according to an example embodiment.

Referring to FIG. 5A-A, when the first chat room is being displayed on the display unit of the first device 100, the first device 100 may display a UI 144 for calling options related to the first chat room on the display unit of the first device 100. In addition, the first device 100 may receive a user input of selecting the UI 144 for calling the options related to the first chat room. For example, the first device 100 may receive a user action of touching the UI 144 for calling the options related to the first chat room.

Referring to FIG. 5A-B, when a user input of calling the options related to the first chat room, the first device 100 may display an option tab 146 of the first chat room on the display unit. The option tab 146 of the first chat room may include a UI 148 for creating the second chat room. In addition, the first device 100 may receive a user input of selecting the UI 148 for creating the second chat room. For example, the first device 100 may detect a user action of touching the UI 148 for creating the second chat room.

Referring to FIG. 5A-C, when a user input of creating the second chat room, the first device 100 may display a UI for creating the second chat room on the display unit. The first device 100 may display a UI 150 for inviting persons to the second chat room on the display unit. At this time, the first device 100 may display a list of persons participating in the first chat room in the UI 150 for inviting the persons. In addition, the first device 100 may receive a user input of selecting at least some of the persons included in the corresponding list. For example, the first device 100 may display the list of the persons participating in the first chat room in the UI 150 for inviting the persons. In addition, the first device 100 may display the UI 150 for inviting the persons in the form capable of selecting some persons from the corresponding list. In addition, the first device 100 may detect a user action of touching the UI 150 for inviting the persons. In this manner, the first device 100 may create the second chat room capable of displaying the visual signs transmitted and received between the first device 100 and at least some of the second devices 200 transmitting and receiving the visual signs through the first chat room.

FIGS. 5B-A and 5B-B are diagrams for describing a method of creating the second chat room by selecting users to participate in the second chat room, according to another example embodiment.

Referring to FIG. 5B-A, when the first chat room is being displayed on the display unit of the first device 100, the first device 100 may receive a user input of selecting at least some of the second devices 200 to be invited to the second chat room. For example, the first device 100 may detect a user action of touching at least a part 152 of the UIs indicating the second devices 200.

Referring to FIG. 5B-B, when a user input of selecting at least a part 152 of the UIs indicating the second devices 200 is received, the first device 100 may create the second chat room 154 capable of displaying the visual signs transmitted and received between the first device 100 and the selected second devices 200. In this case, the first device 100 may display the visual signs 156, which are transmitted from the second devices 200 selected by the user input, in the created second chat room. In this case, the first device 100 may display the visual signs 156, which are transmitted from the second devices 200 selected by the user input, in the second chat room.

An example of selecting only one of the UIs indicating the second devices 200 is illustrated in FIG. 5B-A, but inventive concepts should not be limited to this example. Rather, a plurality of UIs indicating the second devices 200 may be selected to invite a plurality of second devices 200 to the second chat room by using a method of multi-touching two or more of the plurality of UIs, a method of sequentially clicking or touching two or more of the plurality of UIs, or a method of clicking or touching the first UI among the UIs to be selected and then clicking or touching the last UI.

FIGS. 5C-A and 5C-B are diagrams for describing a method of creating the second chat room in which the visual signs selected in the first chat room are displayed, according to another example embodiment.

Referring to FIG. 5C-A, when the first chat room is being displayed on the display unit of the first device 100, the first device 100 may receive a user input of selecting a visual sign 158 received from the at least some second devices 200. For example, the first device 100 may detect a user action of touching the visual sign 158 received from the at least some second devices 200.

Referring to FIG. 5C-B, when a user input of selecting the visual sign 158 received from the at least some second devices 200 is received, the first device 100 may create the second chat room 160 capable of displaying the visual signs transmitted and received between the first device 100 and the second devices 200 having transmitted the selected visual sign 158. In this case, the first device 100 may display the visual sign 158, which is selected by the user input, in the second chat room. In addition, the first device 100 may invite the second devices 200, which have created the selected visual sign 158, to the second chat room. In addition, the second devices 200, which have created the selected visual sign 158, may be automatically invited to the second chat room.

An example of selecting only one of the visual signs displayed in the first chat room is illustrated in FIG. 5C-A, but inventive concepts should not be limited to this example. Rather, a plurality of visual signs may be selected to invite a plurality of second devices 200 having transmitted the corresponding visual signs to the second chat room by using a method of multi-touching the plurality of visual signs, a method of sequentially clicking or touching the plurality of visual signs, or a method of clicking or touching the first visual sign among the visual signs to be selected and then clicking or touching the last visual sign.

By using methods of creating the second chat room, including the example embodiments illustrated in FIGS. 5A-A, 5A-B, 5A-C, 5B-A, 5B-B, 5C-A and 5C-B, the user may create a second chat room that is capable of performing conversation with some members of the first chat room during conversations through the first chat room or performing one or more conversations about one or more different conversation topics from that being progressed in the first chat room.

Figure 6A:
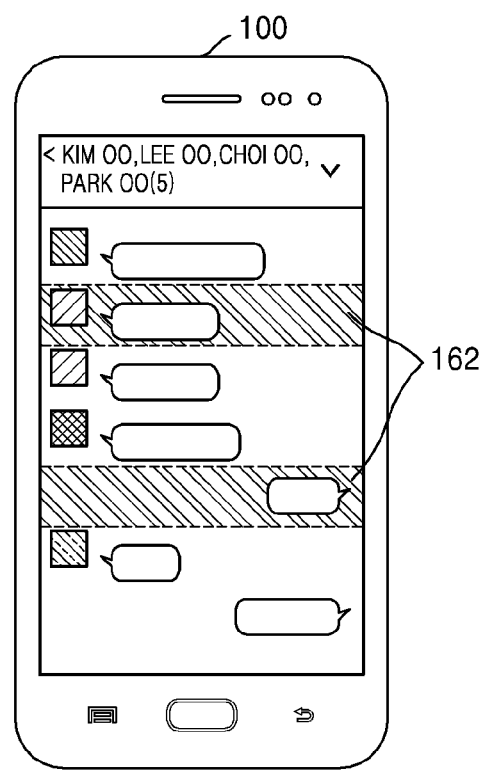
FIGS. 6A and 6B are diagrams for describing a method of concurrently and/or simultaneously displaying a first chat room and a second chat room, according to an example embodiment.
Figure 6B:
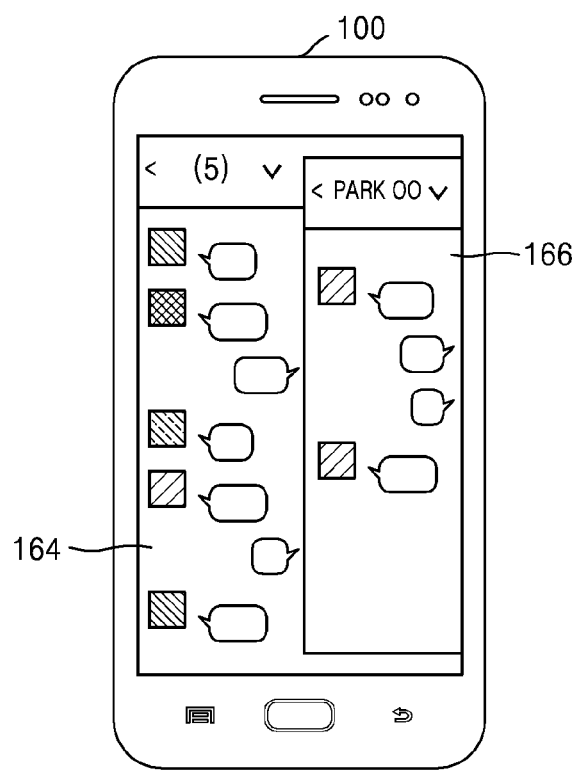

FIGS. 6A and 6B are diagrams for describing a method of concurrently and/or simultaneously displaying the first chat room and the second chat room, according to an example embodiment.

Referring to FIGS. 6A and 6B, the first device 100 may display the visual signs created in the first chat room and the visual signs created in the second chat room on a single screen. In this case, the first device 100 may discriminatively display the visual signs created in the first chat room and the visual signs created in the second chat room.

For example, as illustrated in FIG. 6A, the first device 100 may display a background color of a region 162, in which the visual sign created in the second chat room is located, differently from a background color of a region, in which the visual sign created in the first chat room is located.

As another example, as illustrated in FIG. 6B, the first device 100 may display a first chat room 164 at a first side of the display unit of the first device 100 and display a second chat room 166 at a second side opposite to the first side.

In the examples shown in FIGS. 6A and 6B, the user is allowed to concurrently and/or simultaneously confirm the conversations that are in progress in the first chat room and the second chat room.

Figure 7A:
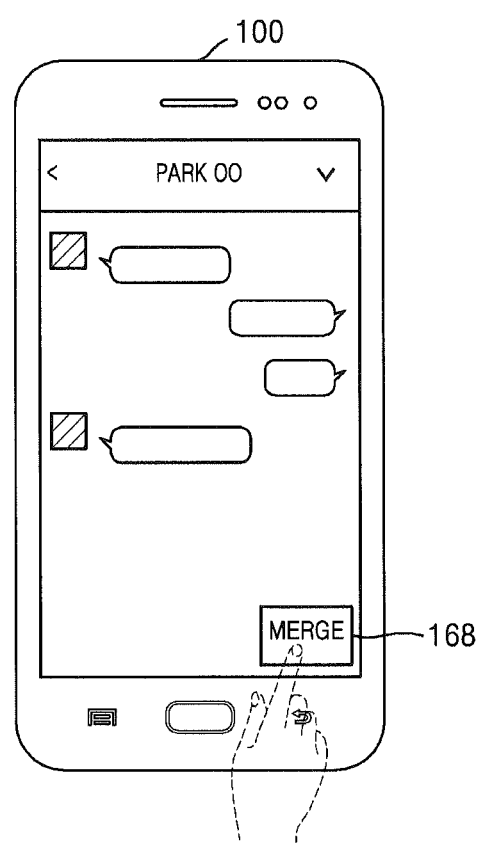
FIGS. 7A, 7B and 7C are diagrams for describing a method of merging content of conversations in one chat room with content of conversations in another chat room, according to an example embodiment.
Figure 7B:
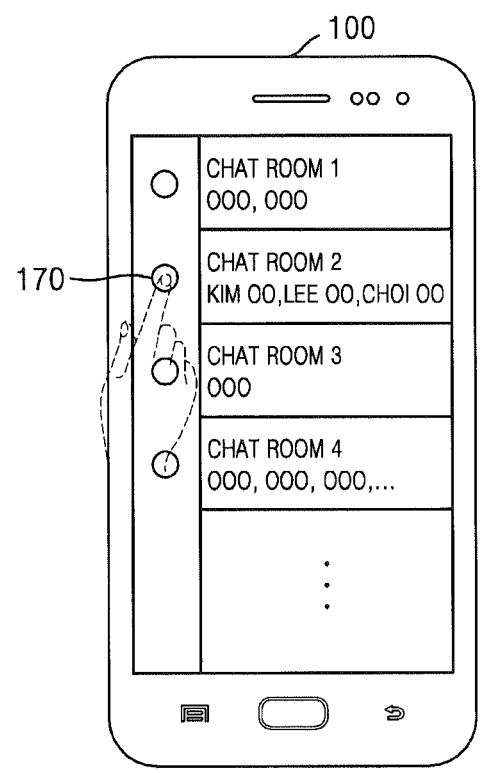
Figure 7C:
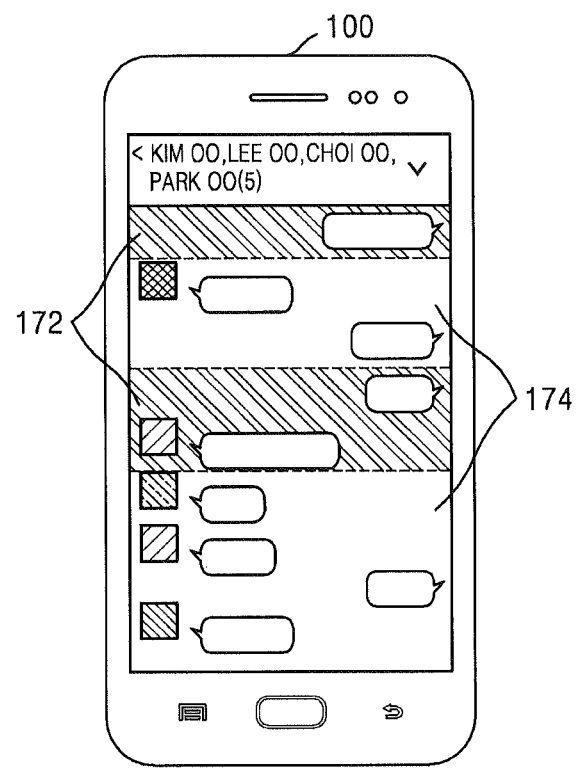

FIGS. 7A, 7B and 7C are diagrams for describing a method of merging content of conversations in one chat room with content of conversations in another chat room, according to an example embodiment.

Referring to FIG. 7A, the first device 100 may display a UI 168 for merging content of conversations in one chat room (e.g., a first chat room) with content of conversations in another chat room (e.g., a second chat room) on the display unit of the first device 100. In addition, the first device 100 may receive a user input of selecting the UI 168 for merging the content of conversations.

For example, as illustrated in FIG. 7A, the first device 100 may detect a user action of touching the UI 168 for merging the content of conversations.

Referring to FIG. 7B, in response to user input for merging the content of conversations in one chat room with the content of conversations in another chat room, the first device 100 may display a UI 170 for selecting the chat room whose content of conversations are to be merged on the display unit of the first device 100. In addition, the first device 100 may receive a user input of selecting the UI 170 for selecting the chat room to be merged. For example, as illustrated in FIG. 7B, the first device 100 may detect a user action of touching the UI 170 for selecting the chat room to be merged.

Referring to FIG. 7C, in response to a user input selecting the chat room to be merged, the first device 100 may merge the content of conversations in two chat rooms, and display the merged content of conversations in one chat room. In this case, the first device 100 may discriminatively display the visual signs created in the two chat rooms. For example, as illustrated in FIG. 7C, the first device 100 may display a background color 172 of a region, in which the visual sign merged from one chat room is located, differently from a background color 174 of a region, in which the visual sign directly created in another chat room is located. The first device 100 may display the merged content of conversations in at least one of the merged two chat rooms. The first device 100 may create a new chat room in which the merged content of conversations is to be displayed. The first device 100 may not display at least one of the merged two chat rooms any more on the display unit of the first device 100.

In this manner, the user may confirm the conversations made in the two chat rooms in one chat room.

FIG. 7A illustrates an example in which the UI 168 for merging the content of conversations in one chat room with the content of conversations in another chat room is displayed while the corresponding chat room is being displayed on the first device 100, but inventive concepts should not be limited to this example. Rather, the UI 168 may be any one of various types of UIs capable of selecting two or more of a plurality of chat rooms.

Figure 8:
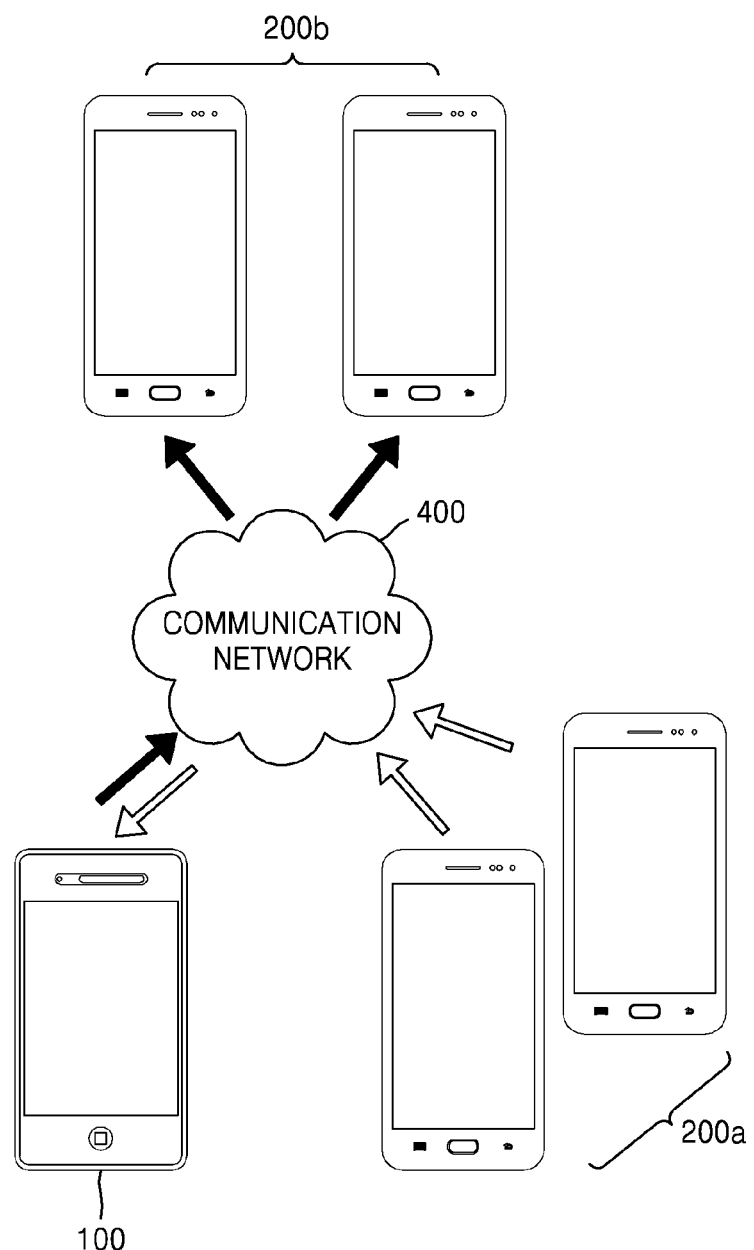
FIG. 8 is a diagram for describing a process of transmitting and receiving information generated during the chat service among a plurality of devices.

FIG. 8 is a diagram for describing an example embodiment of a process of transmitting and receiving information generated during the chat service among a plurality of devices.

Referring to FIG. 8, in a case where the first device 100 obtains permission of at least some of second devices 200a having transmitted and received visual signs through one chat room, the first device 100 may merge the visual signs created in the corresponding chat room with visual signs created in other chat rooms. Hereinafter, one of the chat rooms in which the visual signs to be merged are directly created may be referred to as a third chat room, and the chat room, in which the visual signs to be merged are merged and displayed, may be referred to as a fourth chat room. In a case where the first device 100 does not obtain permission from the at least some of the second devices 200a having transmitted and received visual signs through the third chat room, the first device 100 may not merge the visual signs created in the third chat room with the visual signs created in the first chat room. The term "permission" used herein may refer to an agreement of all of the at least some of the second devices 200a having transmitted and received the visual signs through the third chat room. Even in a case where the first device 100 obtains permission of the at least some of the second devices 200a having transmitted and received visual signs through the third chat room, the first device 100 may not merge the visual signs created in the second chat room with the visual signs created in the first chat room.

The first device 100 may merge only some of the visual signs created in the third chat room, which are permitted by the at least some of the second devices 200a having transmitted and received visual signs through the third chat room, with the visual signs created in the fourth chat room. That is, for example, the first device 100 may display only some of the visual signs created in the third chat room, which are permitted by the at least some of the second devices 200a having transmitted and received visual signs through the third chat room, in the fourth chat room and may not display the other unpermitted visual signs in the fourth chat room. The permission of the at least some of the second devices 200a having transmitted and received the visual signs through the third chat room may refer to the agreement of all the at least some of the second devices 200a having transmitted and received the visual signs through the third chat room.

When the first device 100 obtains permission of the at least some of the second devices 200a having transmitted and received the visual signs through the third chat room, the first device 100 may transmit the visual signs created in the third chat room to second devices 200b having not transmitted and received the visual signs through the third chat room. In this manner, when all the persons having conversed with one another in the third chat room agree, the content of conversations in the third chat room may be shared with persons who converse with one another in the fourth chat room.

The first device 100 or the second device 200 may generate an electronic file containing the content of conversations between the first device 100 and the second device 200. The first device 100 or the second device 200 may generate an electronic file containing edited content of conversations. The first device 100 or the second device 200 may receive a user input of generating an electronic file. For example, the first device 100 may display a UI for storing the content of conversations on the display unit of the first device 100. The first device 100 may detect an action of selecting the corresponding UI. When the first device 100 detects the action of selecting the corresponding UI, the first device 100 may generate an electronic file containing the content of conversations.

Figure 9:
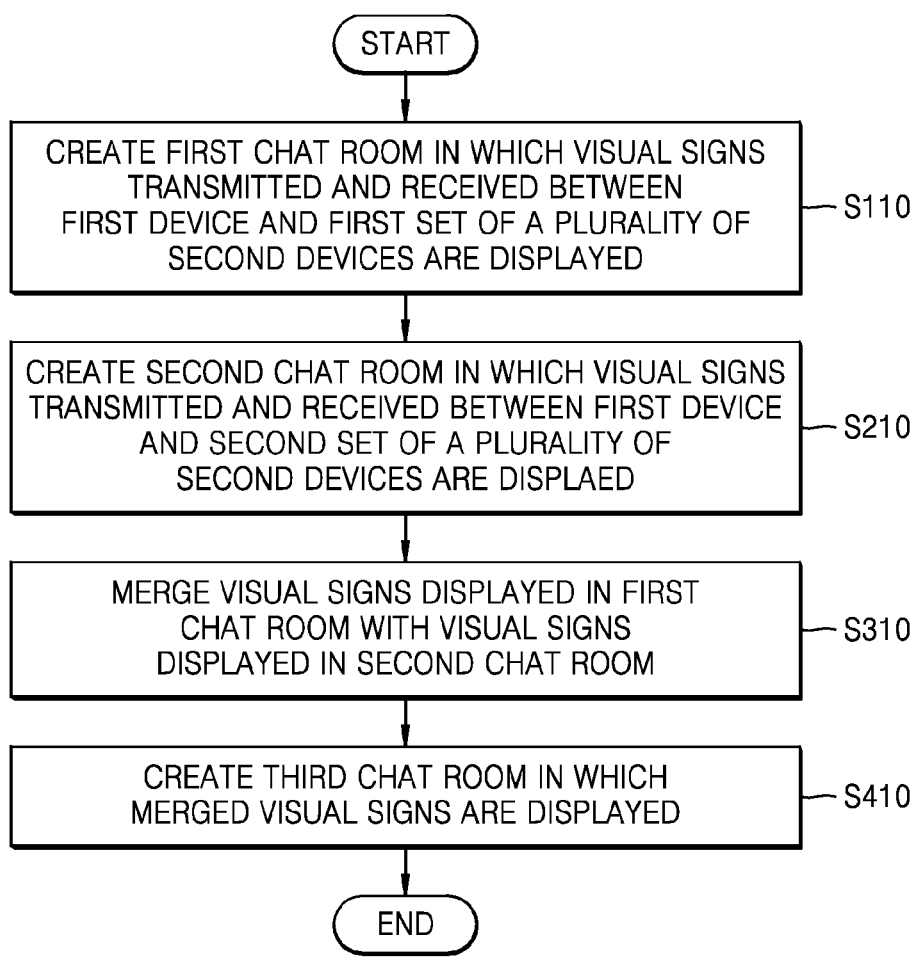
FIG. 9 is a flowchart of a method of providing a chat service, according to an example embodiment.

FIG. 9 is a flowchart of a method of providing a chat service, according to an example embodiment.

The flowchart illustrated in FIG. 9 may include operations processed in time series by the first device 100 that is the device for providing a chat service in FIG. 2. Therefore, even though omitted below, the descriptions provided with reference to the configuration of FIG. 2 may be applied to the flowchart of FIG. 9.

Referring to FIG. 9, the method of providing a chat service, according to at least this example embodiment, may include operation S110 of creating a first chat room in which first visual signs transmitted and received between a first device 100 and a first set of a plurality of second devices 200 are displayable, operation S210 of creating a second chat room in which second visual signs transmitted and received between a first device 100 and a second set of a plurality of second devices 200 are displayable, operation S310 of merging the first visual signs displayed in the first chat room with the second visual signs displayed in the second chat room, and operation S410 of creating a third chat room in which the merged visual signs are displayable. The operation S410 may include discriminatively displaying the visual signs created in the first chat room and the visual signs created in the second chat room.

According to the one or more example embodiments, as described above, it is possible to allow all or part of members to progress visual-sign conversations through a second chat room in the process of visual-sign multilateral conversations through a first chat room, thus progressing conversation about a separate topic or conversation associated with only some members of the first chat room.

In addition, it is possible to merge content of conversations in a first chat room with content of conversations in a second chat room, and to display the merged content of conversations in a single chat room, thus confirming the content of conversations having progressed in a plurality of chat rooms at once.

As discussed similarly above, one or more example embodiments may be embodied as program instructions that may be executed by various processing circuits and/or circuitry, and may be recorded on a non-transitory computer-readable recording medium. Examples of non-transitory computer-readable recording mediums include a magnetic medium (such as a hard disc, a floppy disk, and a magnetic tape), an optical medium (such as a compact disc (CD)-read-only memory (ROM) and a digital versatile memory (DVD)), a magneto-optical medium (such as a floptical disk), and a hardware device specially configured to store and execute program instructions (such as a ROM, a random access memory (RAM), and a flash memory).

The computer programs may be specifically designed and configured for inventive concepts. Examples of the computer programs include not only machine language codes prepared by a compiler, but also high-level codes executable by a computer by using an interpreter.

Example embodiments set forth herein are merely examples and are not intended to limit the scope of inventive concepts. For clarity, other functional aspects of the existing electronic structures, control systems, software, and systems may not be described herein. Also, lines or connecting members that connect components illustrated in the drawings are merely used to represent functional connection and/or physical or circuit connections, and thus, may be replaced with other elements or used to represent additional various other functional connections, physical connection, or circuit connections when inventive concepts are applied to actual apparatuses. Also, components illustrated in the drawings may be omitted unless they are particularly stated using expressions such as "necessary" or "important".

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of inventive concepts as defined by the following claims.

What is claimed is:

1. A method of providing a chat service between a first device and a plurality of second devices, the method comprising:

creating a first chat room to display first visual signs transmitted between the first device and the plurality of second devices;

receiving a command to select one or more of the plurality of second devices while the first chat room is displayed on the first device;

selecting the one or more of the plurality of second devices based on the command;

creating a second chat room to display second visual signs transmitted between the first device and the selected one or more of the plurality of second devices;

merging only a subset of the second visual signs displayed in the second chat room with the first visual signs displayed in the first chat room; and displaying, in sequence, the merged visual signs in the first chat room based on transmission or reception times of the merged visual signs, wherein the merging and the displaying are based on permission received from at least one of the selected one or more of the plurality of second devices, the subset of the -second visual signs includes a first portion of the second visual signs for which the permission is received and does not include a second portion of the second visual signs for which the permission is not received, the subset of the second visual signs includes only second visual signs permitted by the at least one of the selected one or more of the plurality of second devices to be merged with the first visual signs displayed in the first chat room, and the subset of the second visual signs includes less than all of the second visual signs displayed in the second chat room.

2. The method of claim 1, wherein
the command is a command to select one or more of the first visual signs displayed in the first chat room; and
the selecting selects, as the one or more of the plurality of second devices, one or more of the plurality of second devices having transmitted the selected one or more of the first visual signs.

3. The method of claim 2, further comprising:
displaying the selected one or more of the first visual signs in the second chat room.

4. The method of claim 1, further comprising:
displaying, in the second chat room, the first visual signs transmitted by the selected one or more of the plurality of second devices.

5. The method of claim 1, further comprising:
displaying, on a single screen after the creating of the second chat room, first visual signs created in the first chat room and second visual signs created in the second chat room.

6. The method of claim 1, further comprising:
discriminatively displaying, on a single screen after the creating of the second chat room, first visual signs created in the first chat room and second visual signs created in the second chat room.

7. The method of claim 1, further comprising:
transmitting, based on the permission received from the at least one of the selected one or more of the plurality of second devices, the second visual signs displayed in the second chat room to one or more of the plurality of second devices not participating in the second chat room.

8. The method of claim 1, further comprising:
storing, in an electronic file, at least one of the first visual signs displayed in the first chat room or the second visual signs displayed in the second chat room.

9. The method of claim 1, further comprising:
closing the second chat room when the first chat room is closed.

10. The method of claim 1, wherein the merging merges the subset of the second visual signs with the first visual signs in the first chat room such that the first visual signs and the subset of the second visual signs are shared with the first device and the plurality of second devices in the first chat room.

11. A method of providing a chat service between a first device and a plurality of second devices, the method comprising:

creating a first chat room configured to display first visual signs transmitted between the first device and a first set of the plurality of second devices;

creating a second chat room configured to display second visual signs transmitted between the first device and a second set of the plurality of second devices;

creating a third chat room, merging only a subset of the first visual signs displayed in the first chat room and the second visual signs displayed in the second chat room; and displaying, in sequence, the merged visual signs in the third chat room based on transmission or reception times of the merged visual signs, wherein the merging and the displaying are based on permission received from at least one device of the first set of the plurality of second devices and the second set of the plurality of second devices, the subset of the first visual signs displayed in the first chat room and the second visual signs displayed in the second chat room includes only visual signs permitted by the at least one device of the first set of the plurality of second devices and the second set of the plurality of second devices, the subset of the first visual signs includes a first portion of the first visual signs for which the permission is received and does not include a second portion of the first visual signs for which the permission is not received, and the subset of the first visual signs includes less than all of the first visual signs displayed in the first chat room.

12. The method of claim 11, further comprising:
discriminatively displaying, in the third chat room, first visual signs created in the first chat room and second visual signs created in the second chat room.

13. The method of claim 11, wherein the displaying comprises:
displaying, in the third chat room, visual signs transmitted between the first device, the first set of the plurality of second devices, and the second set of the plurality of second devices.

14. A non-transitory computer-readable recording medium having recorded thereon a program that, when executed by a computer, causes the computer to perform the method of claim 1.

15. A non-transitory computer-readable recording medium having recorded thereon a program that, when executed by a computer, causes the computer to perform the method of claim 11.

* * * * *